United States Patent
Stegmann et al.

(10) Patent No.: US 11,860,353 B2
(45) Date of Patent: Jan. 2, 2024

(54) CHANGING DEVICE FOR OPTICAL COMPONENTS IN A MICROSCOPE

(71) Applicant: Carl Zeiss Microscopy GmbH, Jena (DE)

(72) Inventors: Daniel Stegmann, Großschwabhausen (DE); Peter Schnuell, Gleichen (DE); Michael Fritzsche, Jena (DE); Peter Linke, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 192 days.

(21) Appl. No.: 17/338,470

(22) Filed: Jun. 3, 2021

(65) Prior Publication Data

US 2021/0382287 A1  Dec. 9, 2021
US 2022/0326500 A9  Oct. 13, 2022

(30) Foreign Application Priority Data

Jun. 4, 2020  (DE) .................... 10 2020 207 026.1

(51) Int. Cl.
*G02B 21/24* (2006.01)
*G02B 21/16* (2006.01)
*G02B 21/18* (2006.01)

(52) U.S. Cl.
CPC ........... *G02B 21/248* (2013.01); *G02B 21/16* (2013.01); *G02B 21/18* (2013.01)

(58) Field of Classification Search
CPC ....... G02B 21/248; G02B 21/16; G02B 21/18
(Continued)

(56) References Cited

U.S. PATENT DOCUMENTS 5,530,547 A * 6/1996 Arnold .................. G01M 11/04
  356/508
6,414,805 B1 * 7/2002 Reichman .............. G02B 21/06
  359/361

(Continued)

FOREIGN PATENT DOCUMENTS

DE  10 2004 048 099 A1  4/2006
DE  10 2007 057 436 A1  6/2009

OTHER PUBLICATIONS

"Modular OptiBlocks Prototyping System", Dec. 2007 (Dec. 9, 2007), XP055852487.*

(Continued)

*Primary Examiner* — William R Alexander
*Assistant Examiner* — Sharrief I Broome
(74) *Attorney, Agent, or Firm* — NIXON PEABODY LLP

(57) ABSTRACT

Disclosed is a changing device for optical components in a microscope. The changing device includes an optical component having a flat surface. The changing device further includes a carrier for inserting and/or holding the optical component. The changing device further includes a receptacle for holding the carrier in an optical path of the microscope. The carrier has bearing surfaces for the flat surface of the optical component and positioning surfaces located in the same plane, which are not covered by the optical component, when inserting the latter. The receptacle has bearing surfaces for contact with the positioning surfaces and first attachment means for attaching the carrier positioned on the receptacle in order for the positioning surfaces to act upon the bearing surfaces.

14 Claims, 14 Drawing Sheets

(58) Field of Classification Search
USPC .................................. 359/372, 373, 374, 379
See application file for complete search history.

(56) References Cited

U.S. PATENT DOCUMENTS

| | | | | |
|---|---|---|---|---|
| 2001/0009480 | A1* | 7/2001 | Engelhardt | G02B 21/0024 |
| | | | | 359/811 |
| 2003/0189702 | A1* | 10/2003 | Watanabe | G01N 21/8803 |
| | | | | 356/244 |
| 2008/0221692 | A1* | 9/2008 | Zucherman | A61B 17/7068 |
| | | | | 623/17.11 |
| 2015/0260938 | A1* | 9/2015 | Vandenberg, III | G02B 7/003 |
| | | | | 359/368 |
| 2017/0031125 | A1* | 2/2017 | Lee | G02B 26/008 |
| 2019/0310441 | A1* | 10/2019 | Suchowski | G02B 7/18 |
| 2019/0324255 | A1* | 10/2019 | Pergande | G02B 21/248 |
| 2021/0011267 | A1* | 1/2021 | Fahlbusch | G02B 7/14 |

OTHER PUBLICATIONS

Yoder Jr, Paul R: "Techniques for Mounting Smaller Nonmetallic Mirrors"; 2nd Edition, Dec. 2008 (Dec. 31, 2008), SPIE XP055852343.*
German Search Report for German Application No. 1020207026.1, dated Jan. 5, 2021.

* cited by examiner

CHANGING DEVICE FOR OPTICAL COMPONENTS IN A MICROSCOPE

The present invention relates to a changing device for optical components in a microscope, having an optical component with a flat surface, a carrier for inserting and holding the optical component, and a receptacle for holding the carrier in an optical path of the microscope.

Such a device in the form of a changing system for optical components is known from EP 1055947 B1. Various optical components such as reflectors, filters, polarizers or magnification systems are accommodated in components, and these are held in the changing system by means of a spring force exerted against stops. The components have two flanges, which are pressed by the springs against two parallel angles of the changing system. The angles of the changing system may be formed by two surfaces perpendicular to one another.

EP 2018585 B1 discloses a microscope with a changing device for optical elements and DE 102012003984 A1 discloses a changing device for optical components on a microscope.

Prior-art microscopes are equipped with changing devices, which allow different beam splitters and filters to be inserted into the optical path of the microscope. Replaceable carriers for beam splitters and filters are also part of the prior art.

Based on the above, a changing device for optical components of a microscope is to be provided, which enables accurate positioning of the optical component in the optical path of the microscope and reduces processing efforts.

The invention is defined in claim 1. Advantageous further developments are provided in the dependent claims.

The changing device is used to insert optical components into an optical path of a microscope. The changing device is used, e.g., in fluorescence microscopy, in order to realize fluorescence illumination and fluorescence imaging. The optical component may be a beam splitter or a filter, however, other optical components are conceivable for any microscope application, e.g., incident light, bright field, dark field, or polar applications/contrast. Simultaneous insertion of several optical components into the optical path of the microscope is also provided. With the aid of the optical component in the form of a beam splitter, light rays (excitation light) emitted by a light source are coupled into the optical path of an objective in the microscope.

The optical component is placed in and/or supported by a carrier for insertion into the optical path of the microscope. In fluorescence microscopy, e.g., push-and-click clasps are used as carriers. Other carriers, such as frame-shaped receptacles, are also compatible with the changing device. The optical component, which is inserted into to the carrier, has a flat surface. For example, the optical component may be designed as a plane-parallel plate. Furthermore, bearing surfaces are provided in the carrier, which likewise have a flat surface. The optical component is preferably pressed with its flat surface against the bearing surfaces of the carrier by means of second attachment means. The carrier is attached to the receptacle. First attachment means are provided in order to attach the carrier to the receptacle. In particular, magnets are attached to both the carrier and the receptacle. These magnets may be located on both the receiving and positioning surfaces. By means of the first attachment means, the positioning surfaces of the carrier are held against the bearing surfaces on the receptacle and attached thereto. The main advantage of the changing device is that the surface on which the optical component (in the case of the fluorescence microscope, the beam splitter) rests and the surface with which the carrier rests on the receptacle lie in the same plane. As a result, only the flatness of this surface is included in the tolerance calculations, which translates into more precise placement of the optical component in the optical path, and also a more cost-effective production of the carrier and receptacle. For example, in one-setup machining production, a reduction of the tolerance chain results in a less non-conformance, as well as more favorable machining.

The second attachment means are preferably attached to the carrier and secure the components against the forces occurring during operation or transport (centrifugal force, acceleration force, inertial forces), thus preventing the optical component from detaching from the bearing surfaces. The second attachment means may likewise be attached to the receptacle. Usually, one or more resilient elements are used as attachment means. The resilient elements may be part of the optical component (e.g., solid joints), or designed as extra leaf springs. The resilient elements may likewise be attached directly to a carrier receptacle.

In a fluorescence microscope, the receptacle is usually designed as a reflector turret, but other receptacle designs are also conceivable. However, a microscope, in particular a fluorescence microscope, advantageously contains several different optical components, between which changing is performed manually or mechanically. Thus, several carriers are preferably attached to the receptacle.

It is important that the positioning surfaces on the carrier lie in the same plane as the carrier bearing surfaces. In a preferred embodiment, they are formed, e.g., on the same flange part, lug, etc. If the carrier is attached to the receptacle by the first attachment means, the optical component rests with its flat surface on the carrier in the same plane in which the receptacle rests on the carrier.

In order to realize such attachment of the carrier to the receptacle, the optical component, when pressed against the bearing surfaces on the carrier, may not cover the positioning surfaces of the carrier.

For a short power flux, the magnets are advantageously seated in the receiving or bearing surface, however, care must be taken that the magnets do not protrude beyond the respective surface. In addition to the magnetic force, the contact force may also be realized by spring elements, screws, or the like. The described principle of attaching the carrier allows for beam splitters, filters, or other optical components of different sizes to be installed on the receptacle. Thus, several different-sized carriers may be attached to one receptacle. It is important that the magnetic force, or the relevant other force, when using other second attachment means, be designed, such that the forces occurring during operation and transport (spring force, centrifugal force, inertial forces, etc.) will not cause the carrier to detach from the receptacle.

If the contact force between the carrier and the receptacle is realized by means of magnets, there is the further advantage that the carrier may be changed on the receptacle in a simple manner and without the use of tools. This makes it easier to change the carrier, as desired by the user, in that very specific optical components are sometimes used, especially in fluorescence microscopy.

Furthermore, the option of mounting different-sized optical components in one receptacle ensures that one and the same receptacle is suitable for mounting numerous different carriers. This increases the number of structurally identical receptacles, which could even make new manufacturing processes, such as aluminum die-casting, profitable.

In a preferred embodiment, the optical component inserted into to the optical path of the microscope may be a beam splitter, and the bearing surface for the flat surface of the beam splitter located in a plane inclined at 45° relative to an optical axis being perpendicular between a detector and a sample. Here, too, the receptacle requires mounting surfaces inclined at 45°, which, however, can be obtained with no problems using customary manufacturing machinery (e.g., 5-axis milling machines).

Basically, due to the positioning and bearing surfaces, movement of both the carriers and the beam splitters can only occur parallel to this functional area. Hence, the reflection angle of a beam splitter stays the same, even when the component is displaced, as long as a correspondingly large defined area of the beam splitter is provided with functionally effective layers.

Preferably, the carrier has lateral guides to prevent lateral displacement of the beam splitter on the carrier. Likewise, contact pins are preferably provided on the receptacle in order to prevent lateral displacement of the carrier on the receptacle.

In a further preferred embodiment, the carrier may be formed in two parts by an upper and a lower part being interconnected, preferably by means of a hinge. Here, the positioning surfaces and the bearing surfaces are preferably provided in the upper part, while resilient elements are provided in the lower part. In the two-part embodiment of the carrier, the optical component may be placed on the resilient elements of the lower part, with lateral displacement of the optical component optionally prevented by lateral guides on the lower part. The hinge allows the upper part to be positioned precisely against the lower part. There, the upper part may then be connected to the lower part by additional attachment means. These additional attachment means for connecting the upper and lower part may be realized, e.g., by magnets, whereby locking by means of magnets enables simple, tool-free operation by the user. It is also possible to screw them together or attach them using resilient plates. When the upper part is attached to the lower part, resilient elements press the flat surface of the optical component against the bearing surfaces on the upper part of the carrier, thereby securing the optical component in the carrier.

The carrier may also be used to insert filters into the optical path of a microscope. In another preferred embodiment, a recess may be provided in the carrier for mounting a filter holder. The filters are seated in the filter holders on a receptacle and can be secured in the filter holder by means of a cylindrical fitting bore, and centered. The cylindrical fitting bores for centering the filters may likewise be provided directly in the carrier. Preferably, additional attachment means, such as magnets, are provided in the recesses or the carrier in order to install the filter holder on the carrier. Fixation must be done such that the forces occurring during operation and transport (centrifugal force, acceleration force, inertial forces) will not lift the filter from the surface upon which it is attached. In addition to attaching the filter holder directly on the carrier, a filter wheel may also be provided on the holder, to which the filter holders with the filters contained therein are attached. In this embodiment, the fixation may again be done using magnets. For centering the filter, a cylindrical fitting bore is optionally provided on the filter holder or on the filter wheel, and again, the magnetic force must be selected in this way.

In a preferred embodiment, the carrier may have a chamfer on one side. Similarly, the optical component may have a chamfer on one side. Such a configuration of the carrier and of the optical component makes it possible to ensure that the optical component is installed on the correct side. This prevents the coating of the optical component from being placed the wrong way around in the optical path of the microscope.

The invention will be explained in further detail below by way of example with reference to the drawing. In the drawings.

Figure 3:
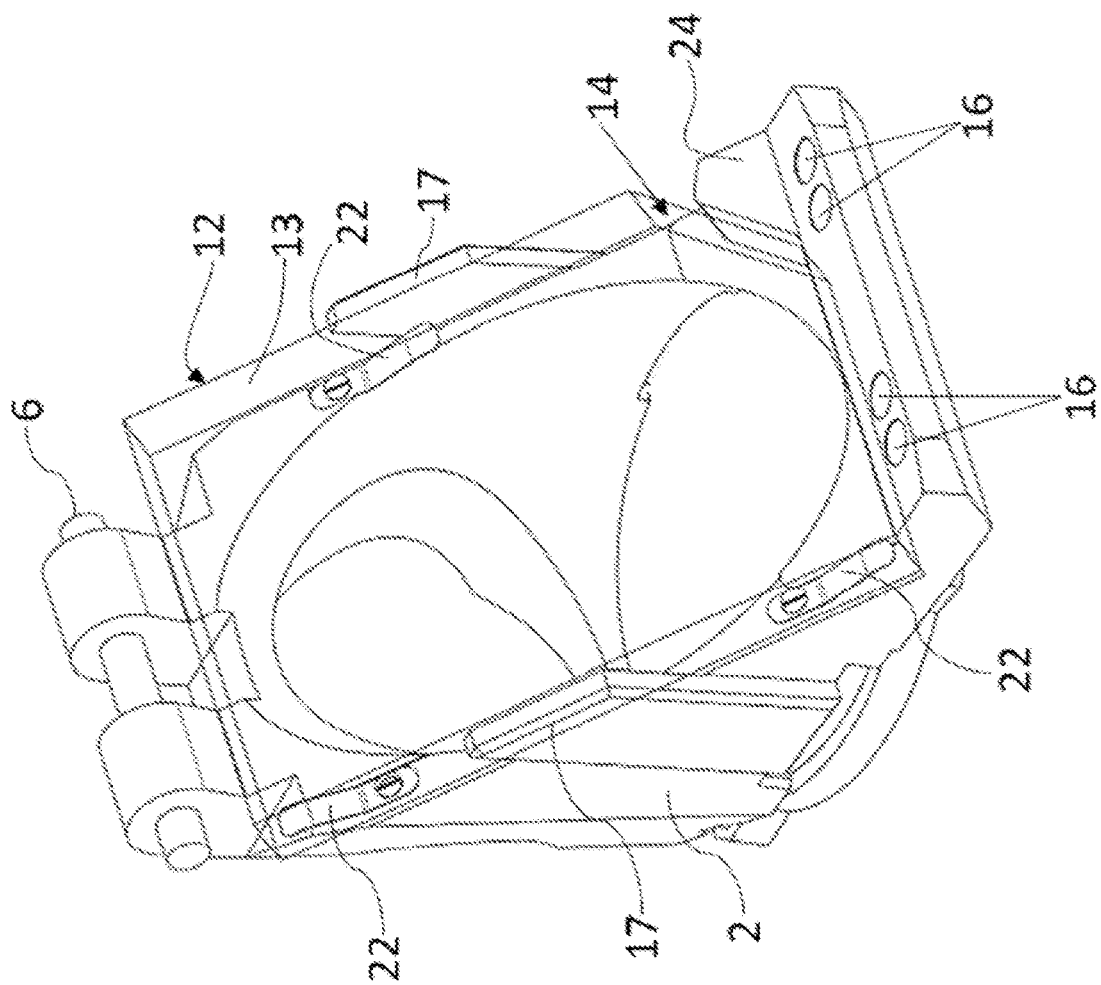
Figure 4A:
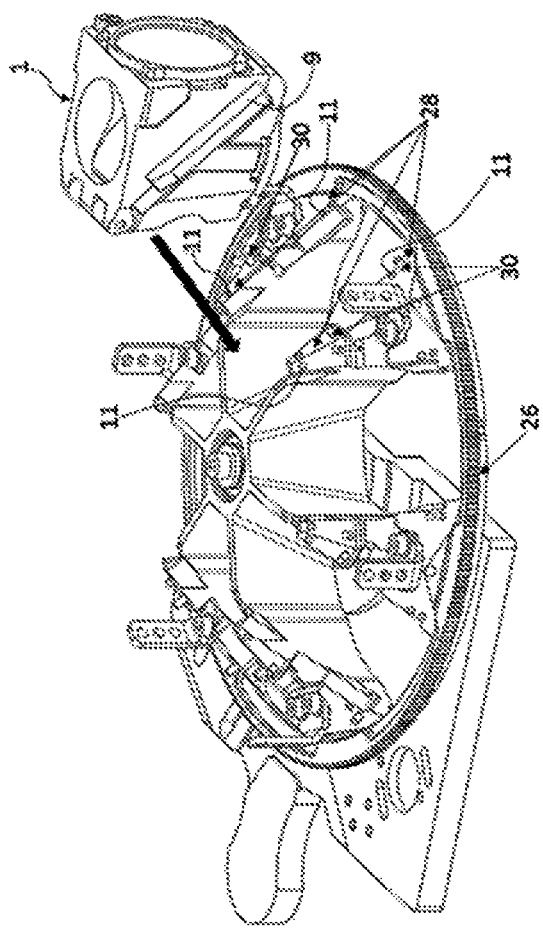
Figure 4B:
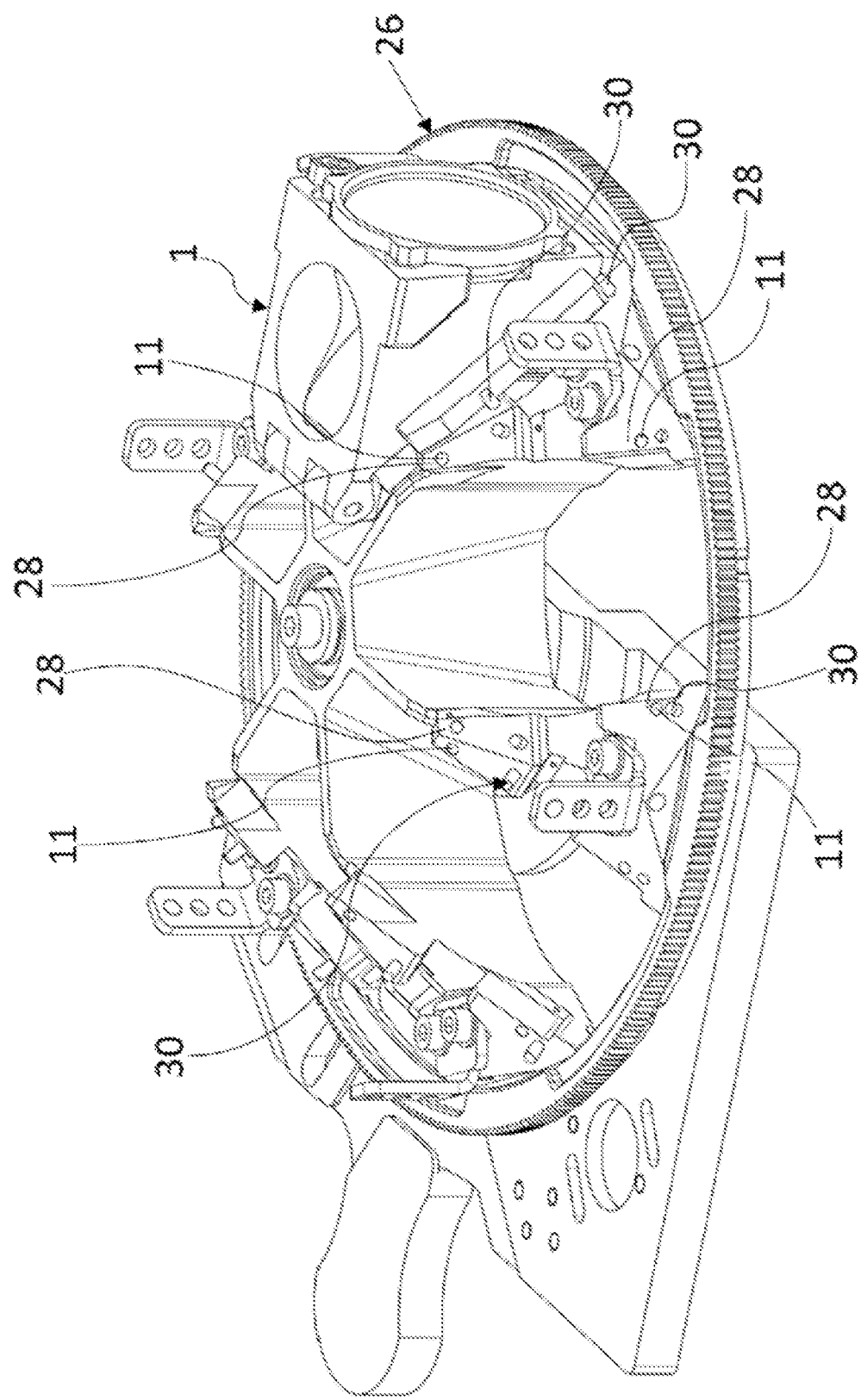
Figure 5:
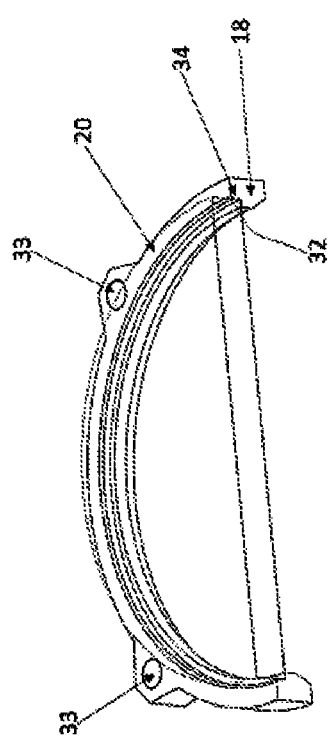
Figure 6:
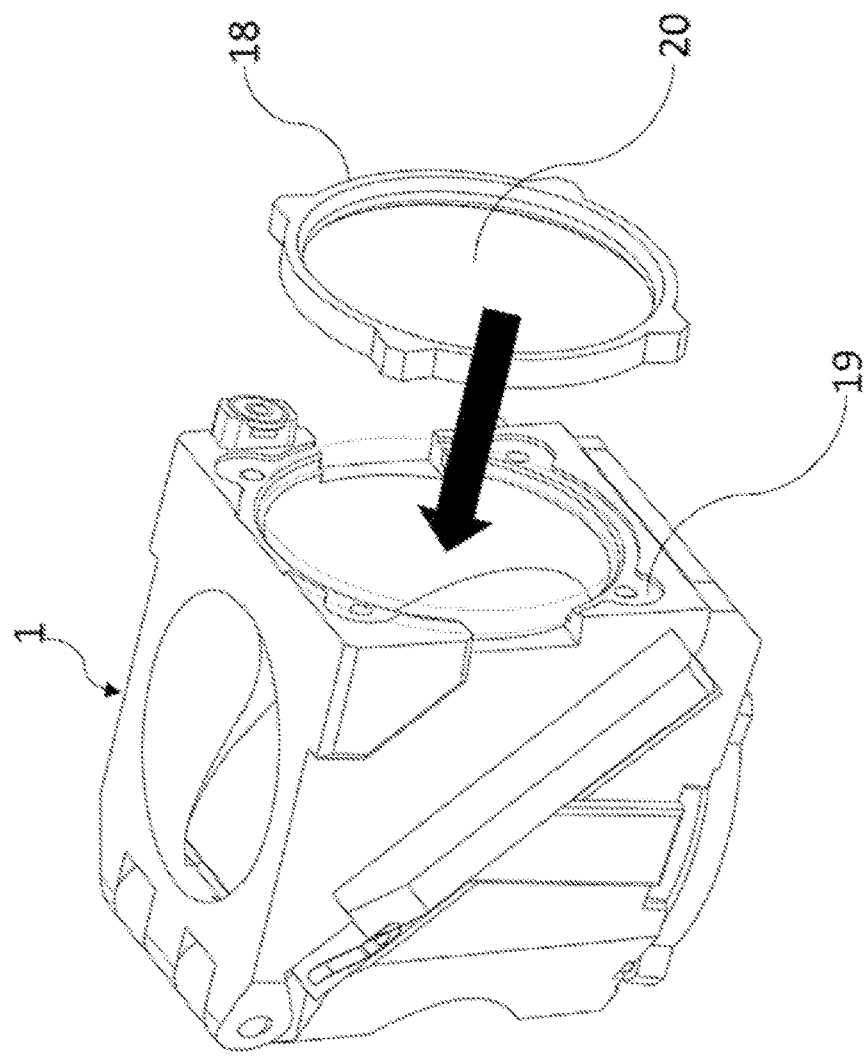
Figure 7:
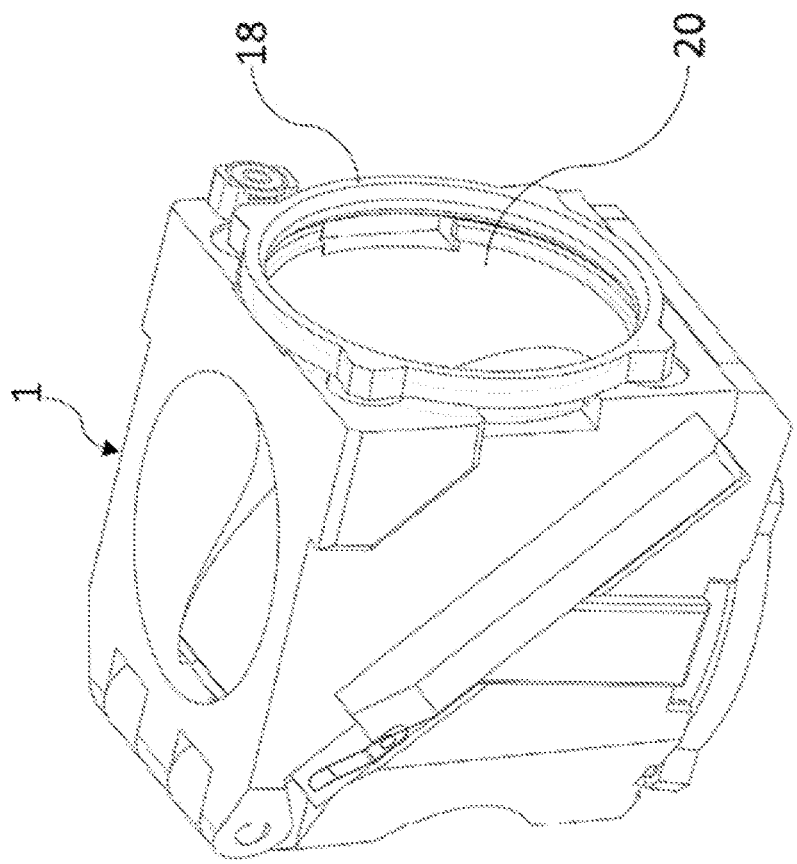
Figure 8:
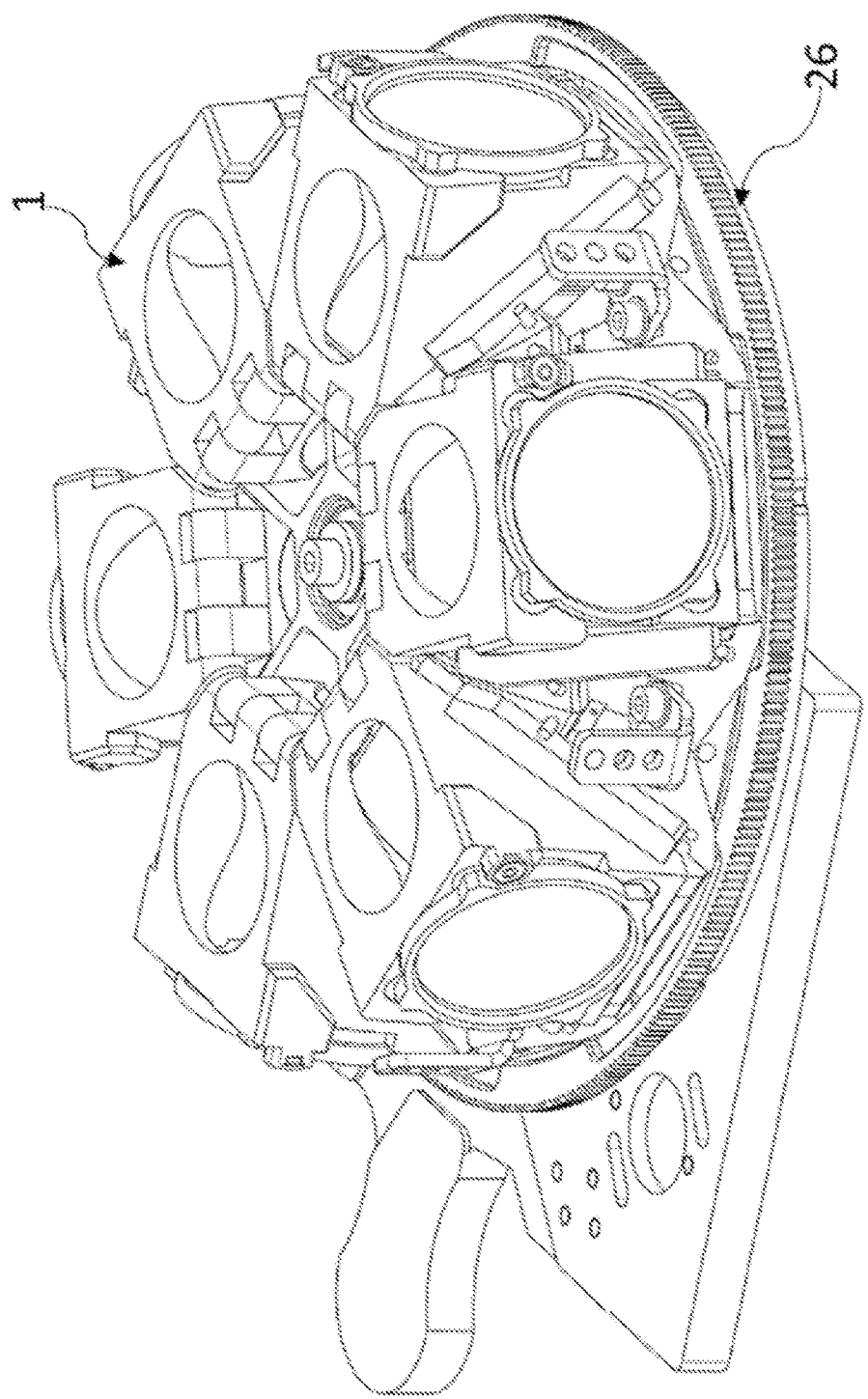
Figure 9:
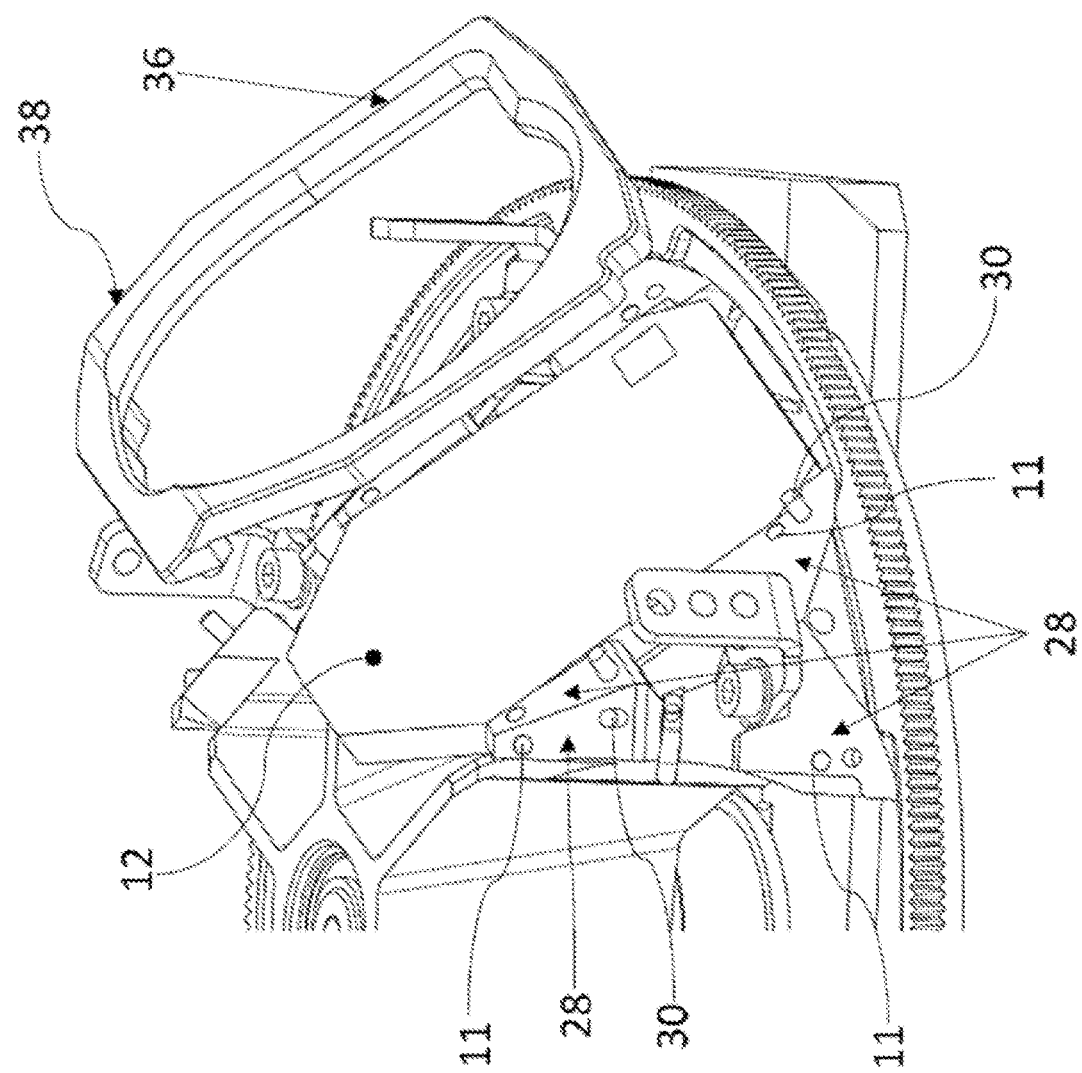
Figure 10:
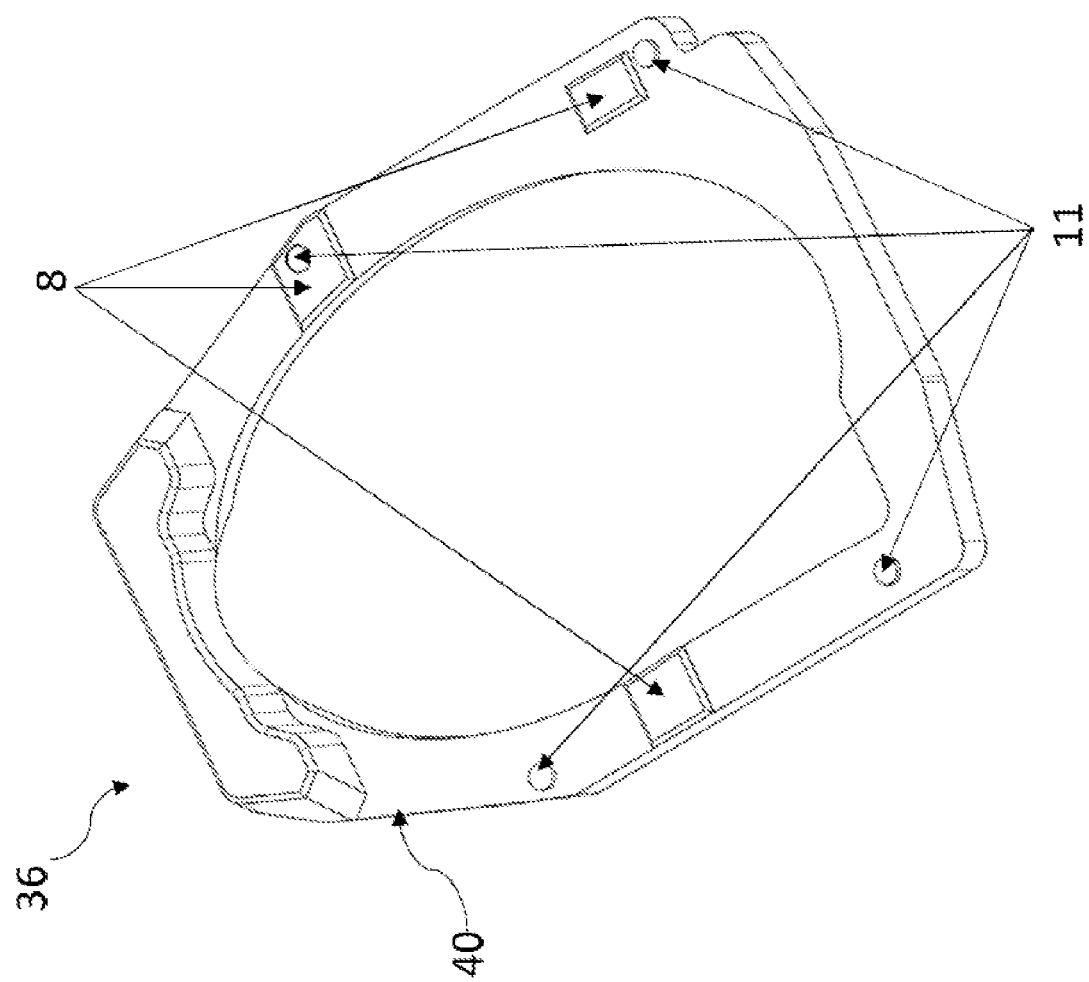
Figure 11:
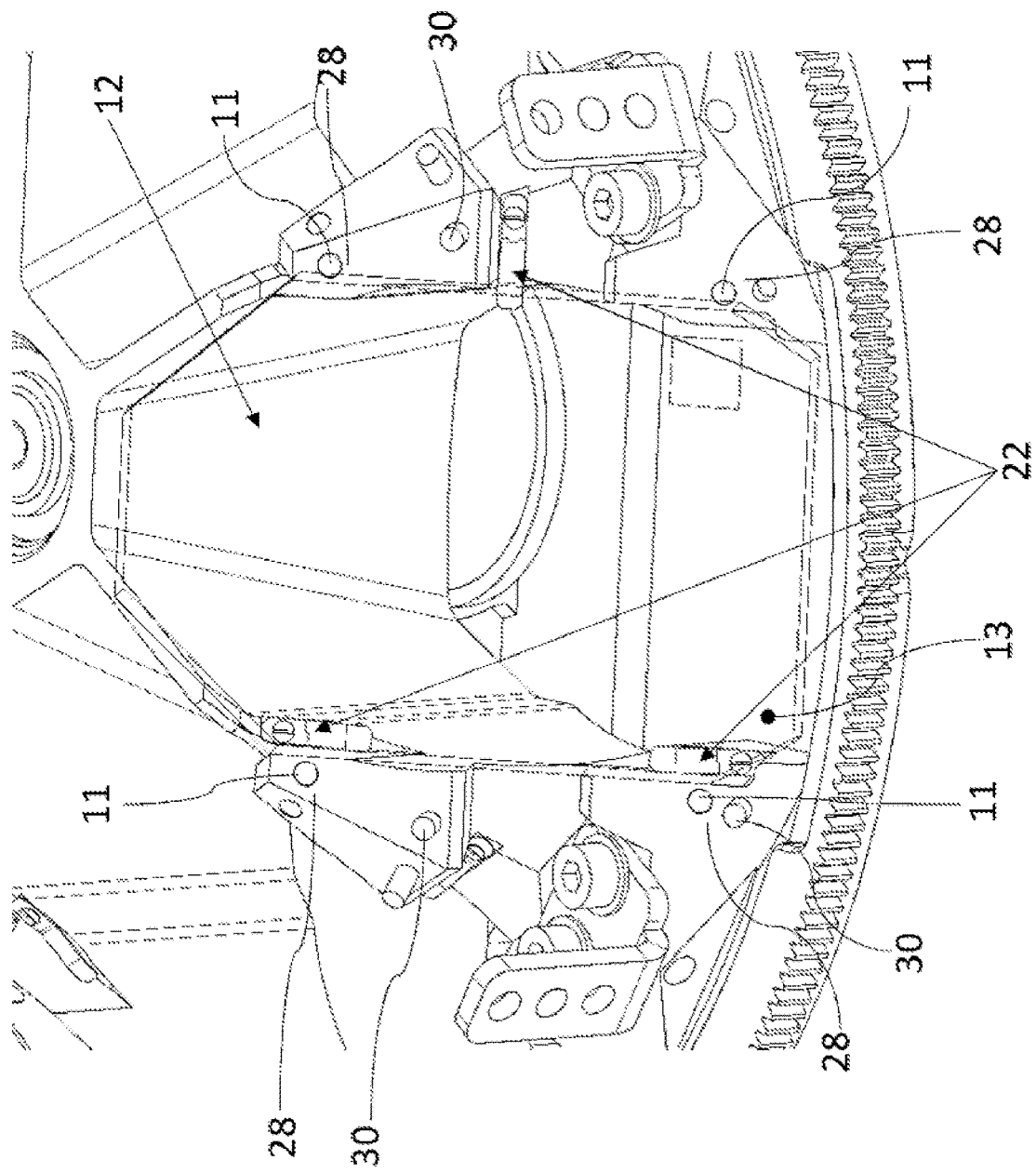
Figure 12:
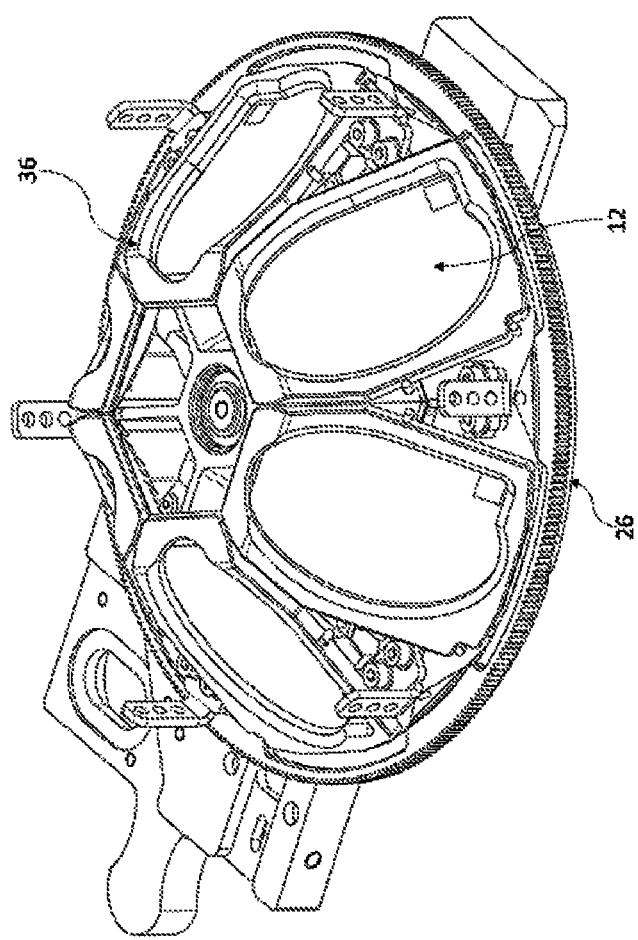
Figure 13:
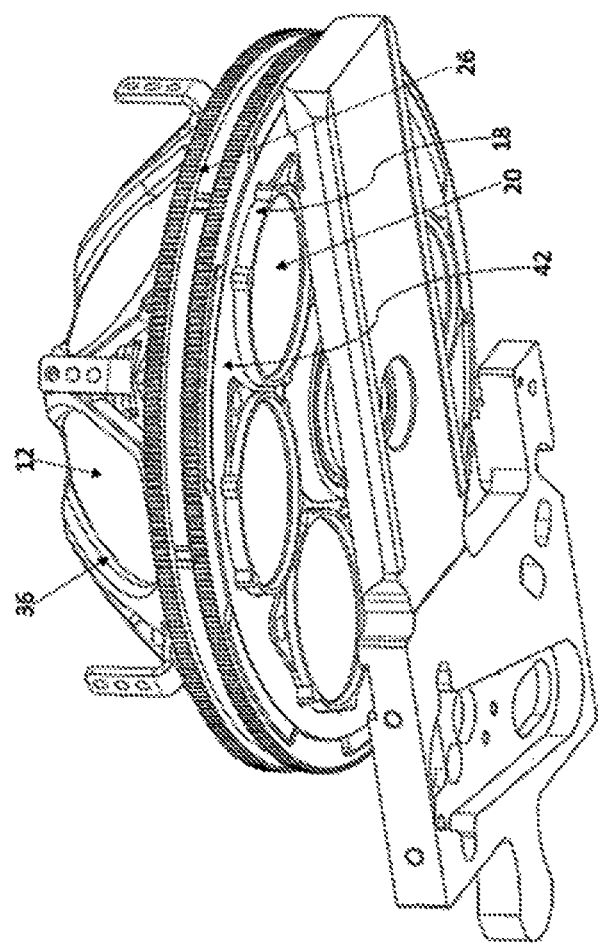

FIG. 3 shows an upper part of a carrier in the embodiment as a push-and-click clasps, FIG. 4A and FIG. 4B show a connection of a carrier to a receptacle, FIG. 5 is a sectional view of a filter with a filter holder, FIG. 6 and FIG. 7 show a connection of a filter holder to a carrier, FIG. 8 shows a changing device fully equipped with carriers, FIG. 9 shows the installation of a carrier in the embodiment as a holder, FIG. 10 is a view of an underside of a holder, FIG. 11 is a view of a receptacle in the case of a carrier being designed as a holder, FIG. 12 shows a changing device fully equipped with holders, and FIG. 13 shows a receptacle provided with a filter wheel.

Figure 1:
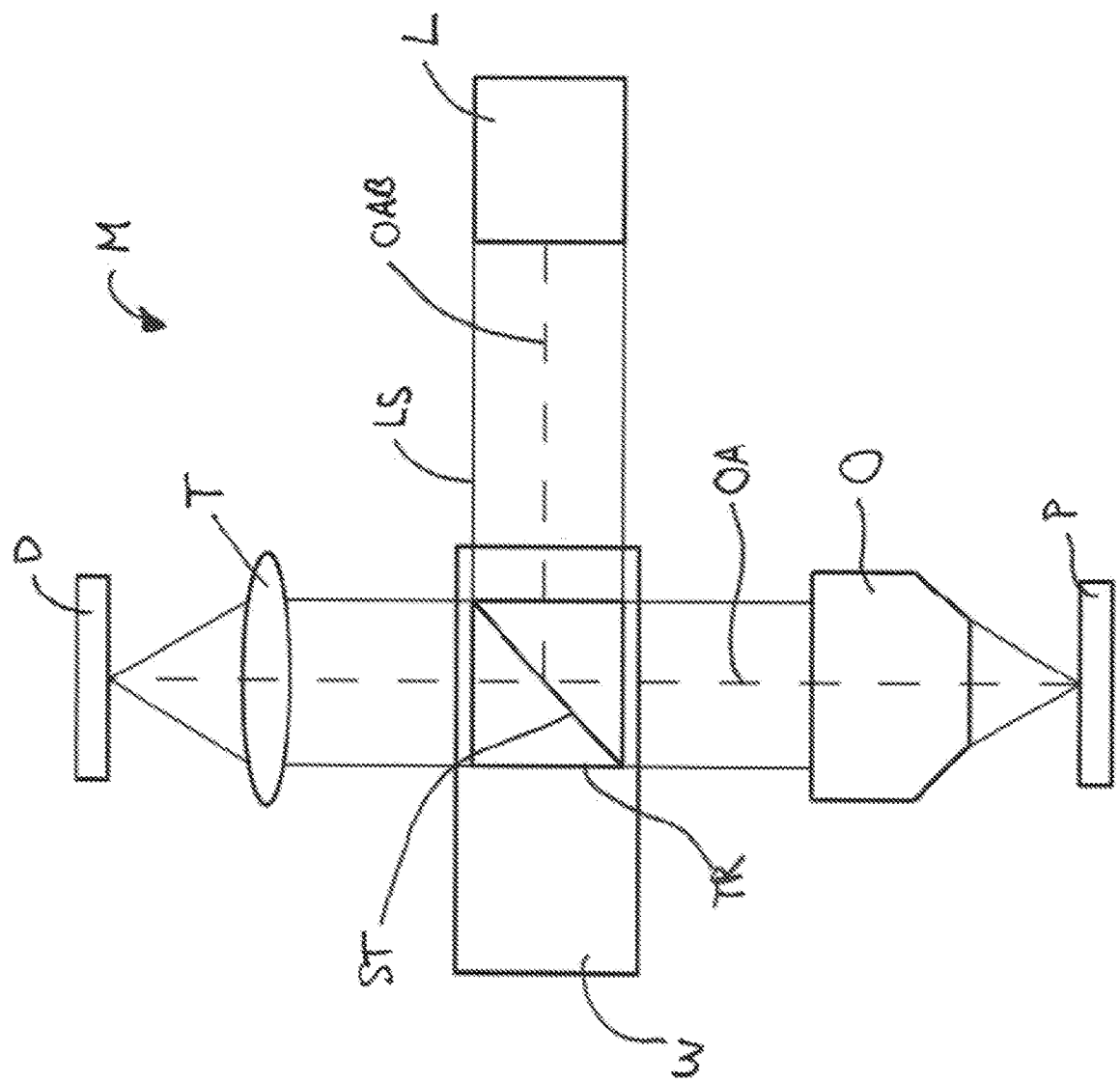
FIG. 1 shows a structure of a microscope.

FIG. 1 shows the basic structure of a microscope M, in which a changing device W is installed. In addition to the changing device W, the microscope M has a light source L, an objective O, a tubular lens T, and a detector D. A beam splitter ST is provided in the changing device W, whereby illumination radiation LS from the light source L, incident along an optical axis OAB and along an optical axis OA, are [sic] redirected onto the specimen P. This beam splitter ST is installed in a carrier TR.

The beam splitter ST is held in the optical path with the aid of the changing device W and the carrier TR installed therein in order to couple the illumination radiation LS, which is emitted by the light source L, into the detection optical path of the microscope M along the optical axis OA and thereby illuminate the specimen P. In one embodiment, the beam splitter ST has filtering properties, whereby it both reflects and transmits light beams LS. In a further embodiment, additional filters are inserted into the optical path. The changing device is used, in particular, in fluorescence microscopy. Since different dyes are prevalent in the fluorescence microscopy application field, each of which excited at a different wavelength and emitting light, the changing device contains several different beam splitters ST, making it possible to switch between them. Each beam splitter ST is installed in a carrier TR. Generally, the option of switching the beams TR is provided, since very specific beam splitters ST are often used.

Figure 2:
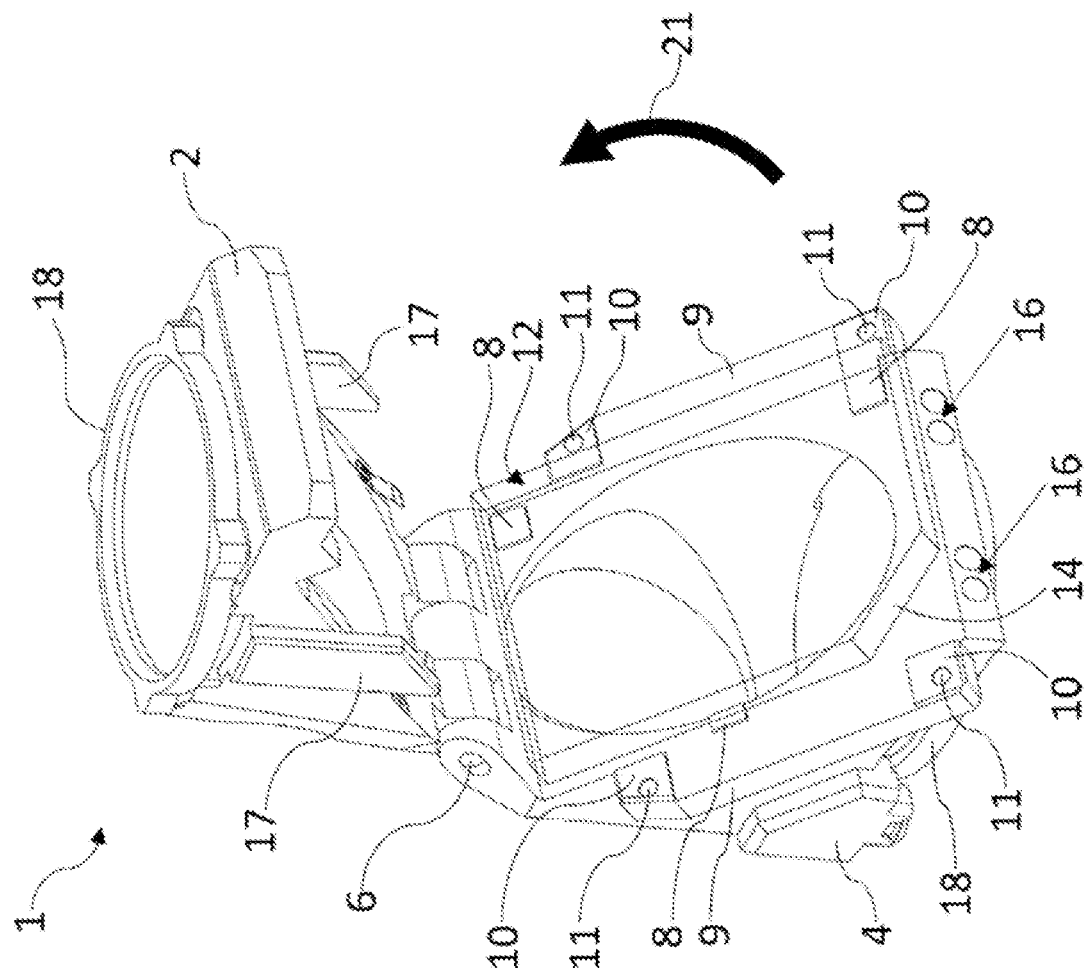
FIG. 2 shows a carrier in one embodiment as a push-and-click clasps.

FIG. 2 shows a carrier 1 in an embodiment as a push-and-click clasp. The carrier 1 is constructed in two parts. It consists of a lower part 2 and an upper part 4. The lower part 2 and the upper part 4 are connected to one another by way of a hinge 6. On the upper part 4 of the carrier 1, bearing surfaces 8 and positioning surfaces 10 are provided on a flange part 9. The positioning surfaces 10 are also located in the same plane on the flange part, which is defined by the bearing surfaces 8. Positioning surfaces 10 are provided with magnets 11. The bearing surfaces 8 may also have magnets 11. A divider 12, which has a flat surface 13, rests on the bearing surfaces 8 of the carrier 1. This divider 12 has a chamfer 14. Further magnets 16 are attached to the upper part 4. Moreover, lateral guides 17 are provided on the carrier 1, and a filter holder 18 is located in a recess 19 provided for this purpose, both on the lower part 2 and on the upper part 4. In addition, a closing direction 21 is specified in FIG. 2.

The splitter 12 is inserted into the optical path of the microscope M by means of the carrier 1. For this purpose, when the upper sides 4 and 2 of the carrier 1 are brought together, the divider 12 having the flat surface 13, is placed against the bearing surfaces 8 provided on the upper part 4 of the carrier 1, and attached thereto by attachment means, such as magnets, screws or resilient plates. In one embodiment, the divider 12 is particularly designed as a plane-parallel plate. In FIG. 2, the divider 12 is shown with the flat surface 13 in contact with the bearing surfaces 8, however, in practice, this is only the case, when the carrier 1 is closed. When the divider 12 with the flat surface 13 is attached to the bearing surfaces 8, it must not cover the positioning surfaces 10, since the positioning surfaces 10 serve to attach the carrier 1 to a receptacle 26. In the exemplary embodiment of FIG. 2, this attachment of the carrier 1 to the receptacle 26 is realized by means of the attachment means, in this exemplary embodiment, magnets 11 on the positioning surfaces 10. With the aid of the hinge 6, the upper part 4 may be positioned precisely against the lower part 2. In this embodiment, magnets 16 are also used to attach the upper part to the lower part, which magnets are located on the upper part 4, however, not on the positioning surfaces 10. In this exemplary embodiment, filter holders 18 are provided in a recess 19 on both the upper part 4 and the lower part 2 in order to insert filters 20 in addition to a divider 12 in the optical path.

FIG. 3 illustrates the carrier 1 as inverted. Thus, FIG. 3 shows a view of the lower part 2 of the carrier 1, when embodied as a push-and-click clasp. In addition to the features already described, the illustration in FIG. 3 shows resilient elements 22, which are attached to the lower part 2 of carrier 1. Furthermore, an additional chamfer 24 is shown on the lower part 2 of the carrier 1. First, the divider 12 is inserted into to the carrier 1, such that it is positioned between the lateral guides 17. These lateral guides 17 prevent lateral displacement of the divider 12, when inserted. In the exemplary embodiment of FIG. 3, the resilient elements 22 are designed as leaf springs. The resilient elements 22 press the divider 12 with the flat surface 13 against the bearing surfaces 8 on the upper part 4 of the carrier, such that, when the carrier 1 is closed in the closing direction 21, whereby the upper part 4 is attached to the lower part 2 by means of the magnets 16, the divider 12 cannot lift from the bearing surfaces 8 due to the forces occurring during operation, such as centrifugal force, acceleration force, inertial forces, or the forces occurring during transport. FIG. 3 further shows that a chamfer (14, 24) is provided both on the divider 12 and on the lower part 2 of the carrier 1. Chamfer 14 is provided on one side of the divider, and chamfer 24 is provided on one side of the lower part 2 of the carrier 1. This arrangement ensures that the divider 12 is inserted laterally correctly.

FIGS. 4A and 4B illustrate the connection of the carrier 1 in the embodiment as a push-and-click clasp with the receptacle 26, which in this embodiment is designed as a reflector turret of the microscope M. As can be seen in both FIGS. 4A and 4B, bearing surfaces 28 and contact pins 30 are provided on the receptacle 26. The contact pins 30 facilitate positioning of the carrier 1 on the receptacle 26. Once the carrier 1 has been attached to the receptacle 26, the bearing surfaces 28 are in direct contact with the positioning surfaces 10 on the flange portion 9 of the carrier 1 and, in this exemplary embodiment, attached thereto by magnets 11. A screw connection or a fastening by resilient elements or other suitable fixing devices would also be conceivable.

As already shown in FIG. 2, filters 20 can also be inserted into to the optical path with the aid of the carrier 1. FIGS. 5-7 illustrate the attachment of the filter 20 to the carrier 1, when the latter 1 is designed as a push-and-click clasp.

FIG. 5 shows a sectional view of the filter holder 18, in which the filter 20 is located. The sectional view in FIG. 5 represents a half section. The filter holder has a circular receptacle 32 for the filter 20. On this receptacle 32 is a cylindrical fitting bore 34, in which the filter 20 is seated. The filter holder 18 has the receptacle 32 on its inner radius. This receptacle is used to hold the filter 20. The filter 20 is fixed in the filter holder 18 on the receptacle 32 with the aid of the cylindrical fitting bore 34. In exemplary embodiments without filter holder 18, the filter 20 may also be fixed directly to the carrier 1 through the cylindrical fitting bore 34. Furthermore, in this exemplary embodiment, the filter holder 18 has four magnets 33, which are used to secure the filter holder in the recess 19 of the carrier 1.

FIGS. 6 and 7 show the installation of the filter holder 18 in the upper part 4 of the carrier 1. In the upper part 4 of the carrier 1, the recess 19 is provided for the installation of the filter holder 18. The filter holder 18 is placed in this recess 19. Magnets 33 are also located in the recess 19, which together with the magnets 33 on the filter holder 18 secure the latter to the carrier 1.

FIG. 8 shows the receptacle 26, which in this embodiment is designed as a reflector turret, fully equipped with six carriers 1, in this exemplary embodiment designed as push-and-click clasps. In FIG. 8, the filters 20, and thus the filter holders 18, which are inserted into to the optical path, are of the same size, as in the preceding figures. Here, the recess 19 and the size of the filter holder 18 may adjusted in order to insert the desired filters 20 into the optical path. Thus, smaller filters 20, as well as larger filters 20, may also be accommodated by means of the changing device W.

If the lateral extent of the filters 20 exceeds a certain size, it is sometimes no longer possible to install them in a push-and-click clasp, as used in the preceding figures. A frame-shaped holder 36 is then installed in the changing device W as carrier 1 on the receptacle 26. Such a constellation is shown in FIG. 9.

In FIG. 9, the holder 36 is used as the carrier 1, and is attached to the receptacle 26 in a fashion analogous to the procedure in FIGS. 4A and 4B. Bearing surfaces 28 and contact pins 30 are provided on the receptacle 26. The contact pins 30 facilitate positioning of the holder 36 on the receptacle 26.

The holder 36 has an upper side 38 and an underside 40. FIG. 10 shows a view of the bottom surface 40 of the holder 36. The holder 36 has bearing surfaces 8 on the underside 40. In addition, the holder 36 has magnets 11 on the underside 40. The magnets 11 are used to secure the holder 36 on the receptacle 26. These may be provided on the supporting surfaces 8, as well as on the positioning surfaces 10. When the holder 36 with the divider 12 is attached to the receptacle 26, the divider 12 rests with its flat surface 13 against the bearing surfaces 8 of the holder 36.

FIG. 11 shows a view of the receptacle 26. As already described, it has receiving pins 30 and bearing surfaces 28. Furthermore, in this exemplary embodiment, resilient elements 22 are provided on the receptacle 26. When attaching the holder 36 to the receptacle, the divider 12 is first inserted into the receptacle 26. As shown in FIG. 11, the former rests on the resilient elements 22, whereby the divider 12 with its flat surface 13 rests against the bearing surfaces 8 of the holder 36, after the holder 36 has been attached to the receptacle 26 and is pressed with the resilient elements 22 against precisely these bearing surfaces 8. In this embodiment, resilient elements 22 are used, however, it would also be conceivable to use, e.g., a solid joint, which is integrated in the receptacle 26. In the present exemplary embodiment, the holder 36 is held on the receptacle 26 by magnets 11. The magnetic force is dimensioned here according to the opposing forces (spring force, centrifugal force, inertial forces, etc.).

FIG. 12 shows the receptacle 26, in this exemplary embodiment designed as a reflector turret, fully equipped with six carriers 1, and in this exemplary embodiment designed as a frame-shaped holder 36. In this embodiment, the changing device W allows for inserting relatively large filters 20 into the optical path, while maintaining the basic principle that the bearing surfaces 8, against which the divider 12 rests with its flat surface 13, and the bearing surfaces 28, against which the carrier 1 rests, are located in the same plane. Moreover, in the exemplary embodiment shown in FIG. 12, the dividers 12 rest with their flat surfaces 13 on the bearing surfaces 8 of the holder 36.

If the changing device is designed as described in FIGS. 9-12, the filters 20 may be inserted into the optical path with the aid of the receptacle 26. In FIG. 13, the receptacle 26 is designed as a reflector turret. A filter wheel 42 is attached to the receptacle 26. Analogous to the principle explained in FIG. 8, recesses 19 are provided in this filter wheel 42, in which the filter holders 18 are fastened by means of magnets 33. The filters 20 are centered again via the cylindrical fitting bore 34, either in the filter wheel 42, or in the filter holder 18. The magnetic force for retaining the filter holder 18 in the recesses 19 is again selected, such that the forces occurring during operation or transport (centrifugal force, acceleration force, inertial forces, etc.) will not lift the filter holder 18 off the support 32.

REFERENCE NUMERAL LIST

1 Carrier
2 Lower part
4 Upper part
6 Hinge
8 Bearing surface
9 Flange part
10 Positioning surface
11 Magnets
12 Divider
13 Flat surface
14 Chamfer
16 Magnet
17 Lateral guide
18 Filter holder
19 Recess
20 Filter
21 Closing direction
22 Resilient element
24 Chamfer
26 Receptacle
28 Bearing surface
30 Contact pins
32 Bearing surface
33 Magnet
34 Cylindrical fitting bore
36 Holder
38 Upper side
40 Lower side
42 Filter wheel

The invention claimed is:

1. A changing device for optical components in a microscope, comprising: an optical component having a flat surface, a carrier for inserting and/or holding the optical component, and a receptacle for holding the carrier in an optical path of the microscope, wherein the carrier has bearing surfaces for the flat surface of the optical component and positioning surfaces located in the same plane, which are not covered by the optical component, when inserting the latter, and the receptacle has bearing surfaces for placement of the positioning surfaces, and first attachment means for attaching the carrier positioned on the receptacle in order for the positioning surfaces to press against the bearing surfaces.

2. The changing device according to claim 1, wherein second attachment means for attaching the optical component and pressing the flat surface against the bearing surfaces.

3. The changing device according to claim 1, wherein the bearing surfaces and the positioning surfaces are formed on a flange part.

4. The changing device according to claim 1, wherein the optical component is a beam splitter and the bearing surfaces for the flat surface of the optical component are inclined 45° relative to an optical axis.

5. The changing device according to claim 1, wherein the receptacle has contact pins, which contact the carrier, when installed.

6. The changing device according to claim 1, wherein the carrier is formed in two parts by an upper part and a lower part, wherein the positioning surfaces and the bearing surfaces are formed on the upper part, and the lower part secures the optical component on the upper part.

7. The changing device according to claim 6, wherein the upper part and the lower part are connected by a hinge.

8. The changing device according to claim 6, wherein the upper part and the lower part are fixed against each other by magnets, screws and/or resilient plates.

9. The changing device according to claim 1, wherein the first and/or second attachment means has screws, magnets and/or springs.

10. The changing device according to claim 1, wherein recesses for the attachment of filter holders are provided on the carrier.

11. The changing device according to claim 10, wherein magnets for fixing the filter holders are provided in the recesses.

12. The changing device according to claim 10, wherein a filter is centered by a cylindrical fitting bore in the filter holder and/or in the carrier.

13. The changing device according to claim 1, wherein the carrier and the optical component comprise a chamfer on one side for positioning the optical component in the plane defined by the positioning surfaces and the bearing surfaces.

14. The changing device according to claim 1, further comprising:
a plurality of the optical component; and
a plurality of the carrier, each carrier of the plurality of the carrier for inserting and/or holding one optical component of the plurality of the optical component, wherein the receptacle holds each carrier of the plurality of the carrier in the optical path of the microscope.

* * * * *